June 28, 1949.                A. SIMMON                2,474,379
                    CAMERA VIEW AND RANGE FINDER
Filed June 26, 1946                              6 Sheets-Sheet 1
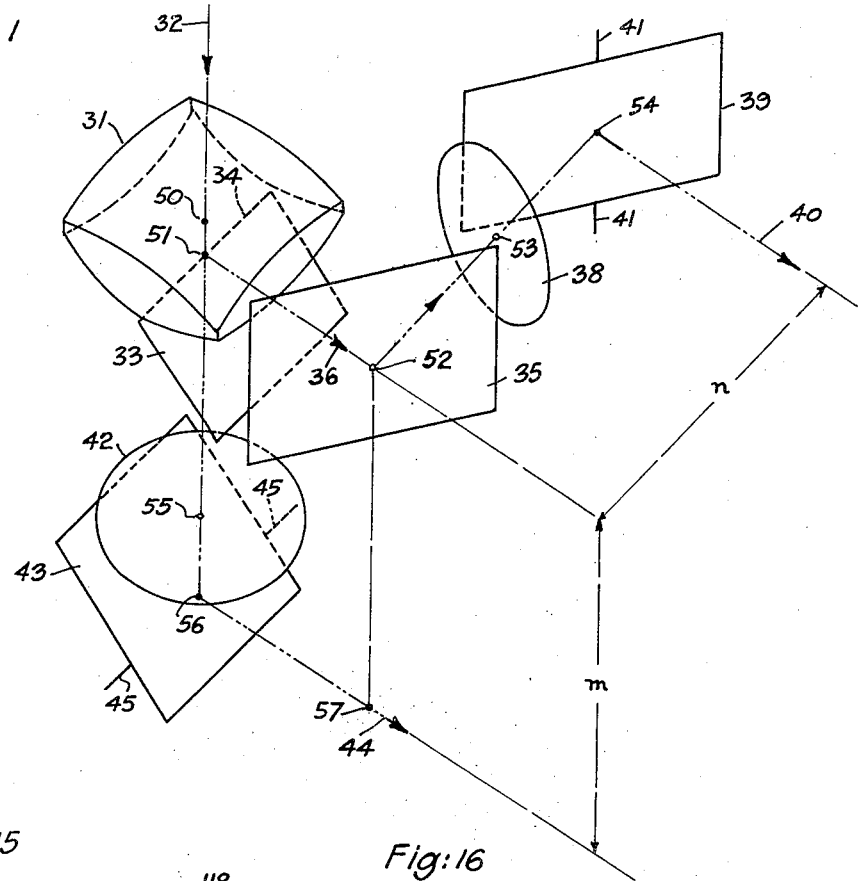
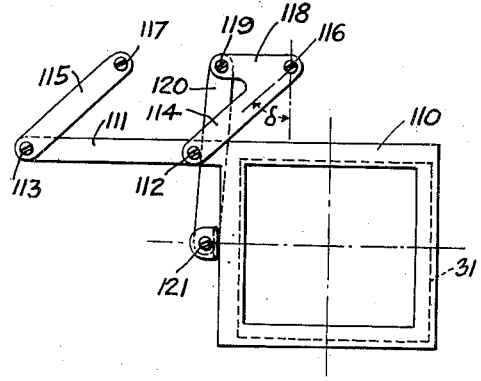
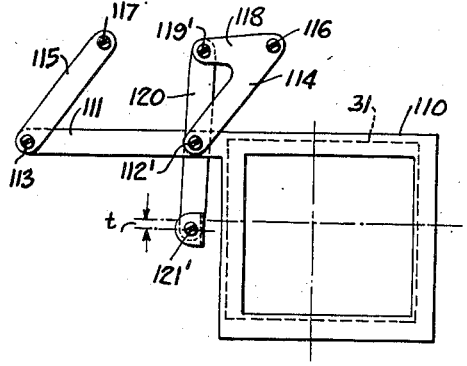
Alfred Simmon
INVENTOR
BY Walter E. Wallheim
ATTORNEY June 28, 1949.                A. SIMMON                    2,474,379
                       CAMERA VIEW AND RANGE FINDER
Filed June 26, 1946                                 6 Sheets-Sheet 2
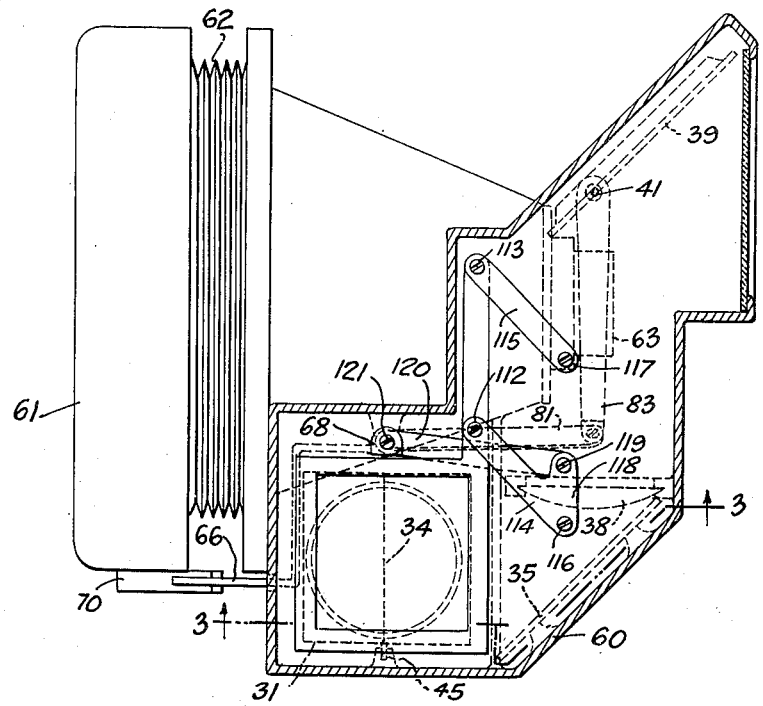
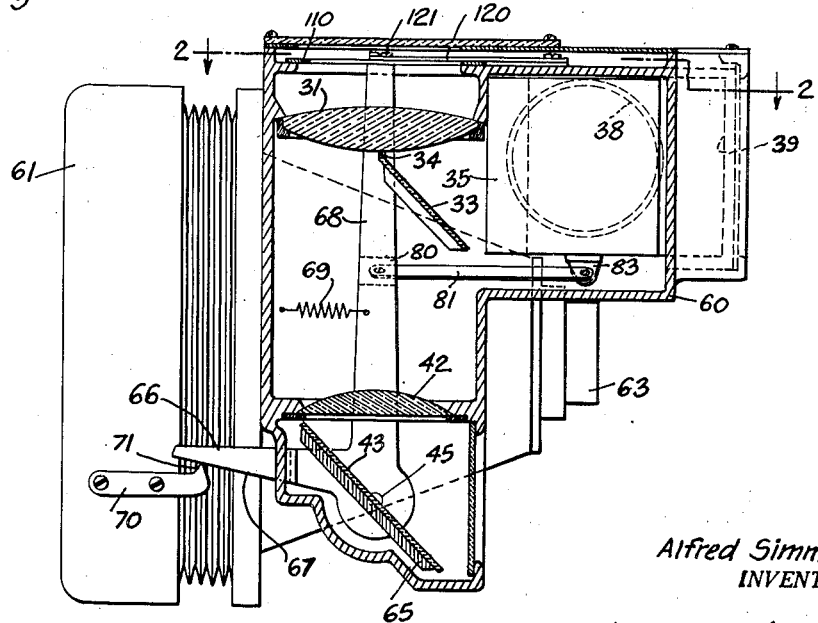
Alfred Simmon
INVENTOR.
BY Walter E. Wollheim
ATTORNEY.

June 28, 1949.   A. SIMMON   2,474,379
CAMERA VIEW AND RANGE FINDER
Filed June 26, 1946   6 Sheets-Sheet 3
Fig: 4
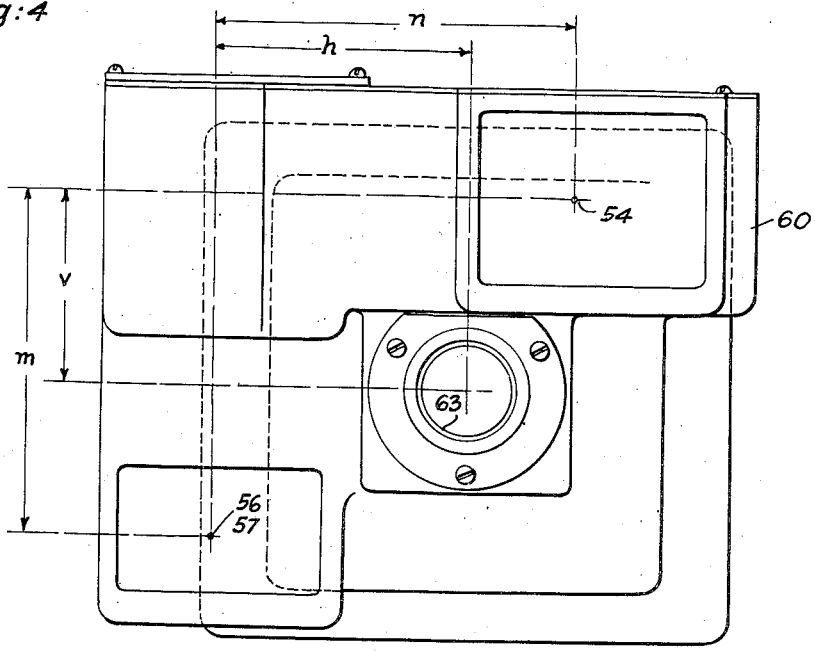
Fig: 8
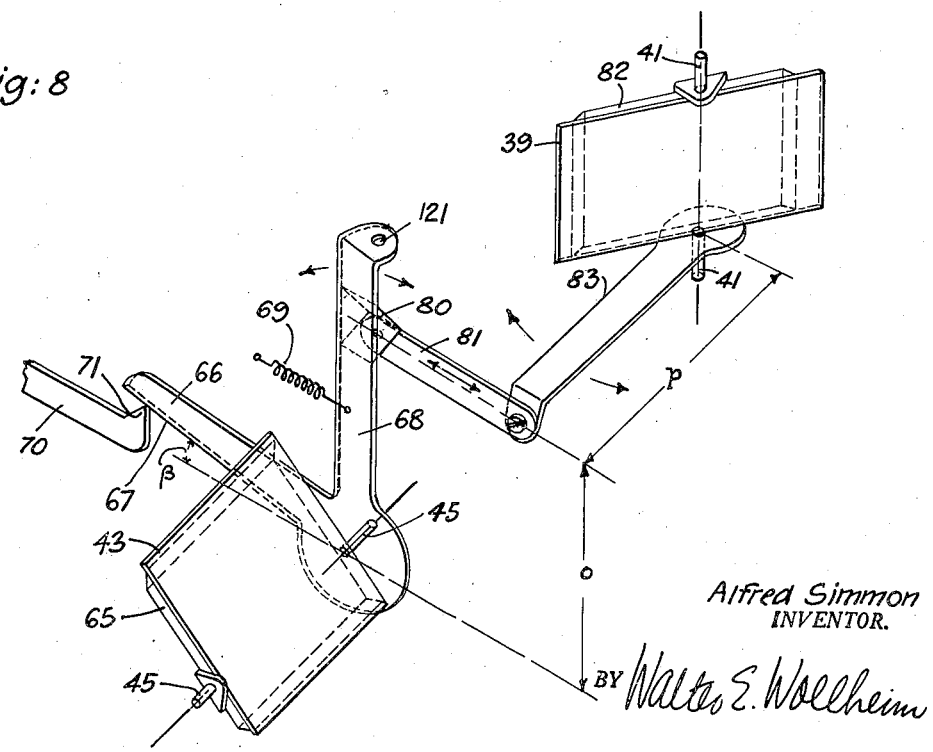
Alfred Simmon
INVENTOR.
BY Walter E. Wollheim
ATTORNEY.

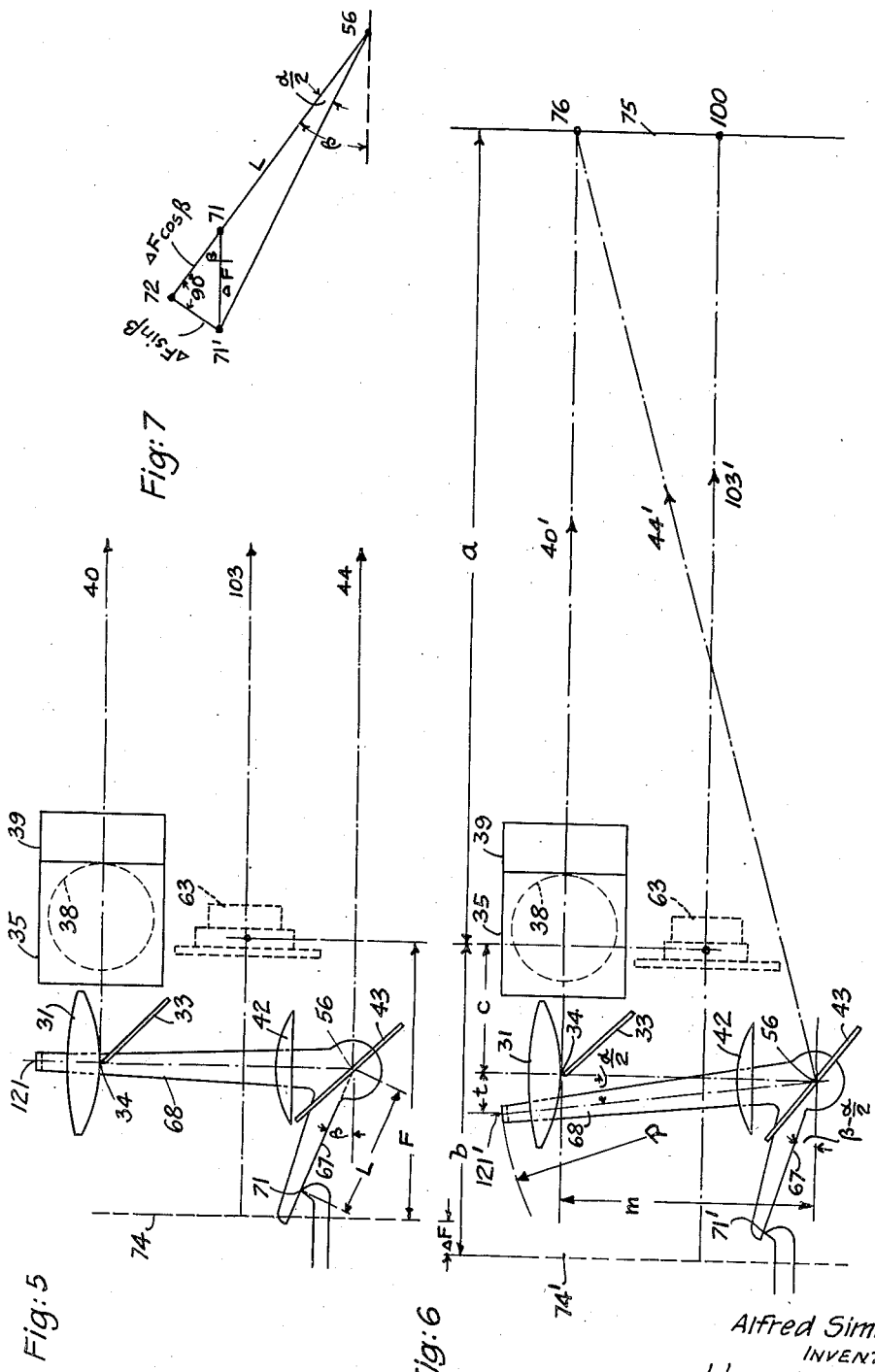

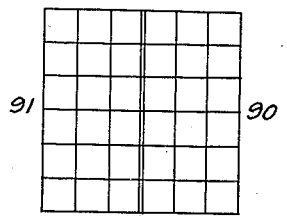
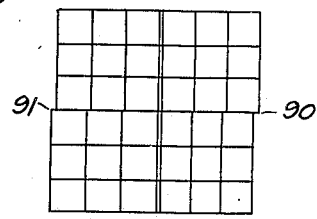
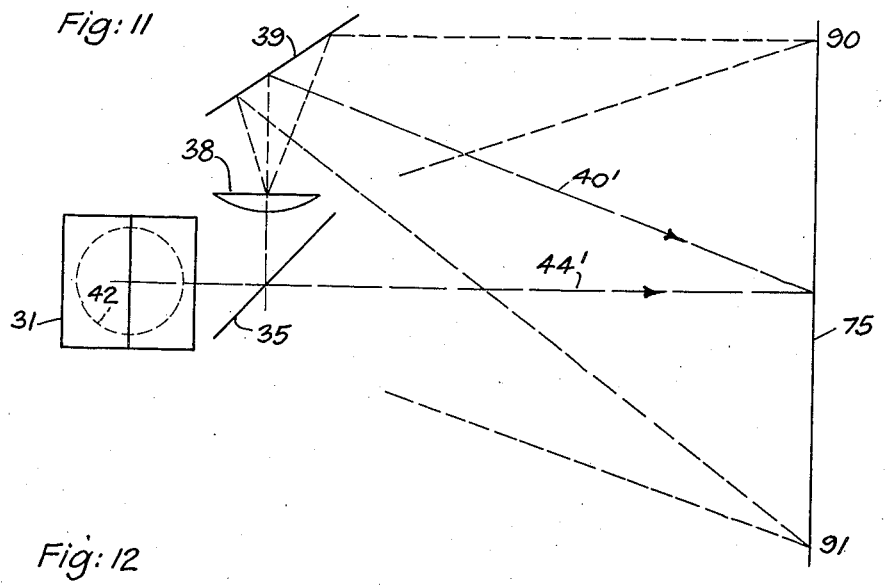
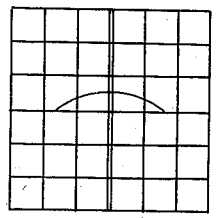
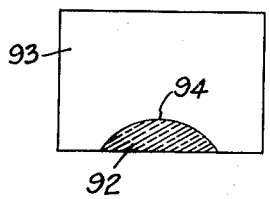
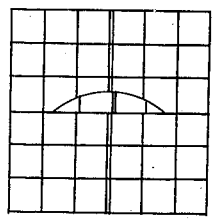

June 28, 1949.	A. SIMMON	2,474,379
CAMERA VIEW AND RANGE FINDER
Filed June 26, 1946	6 Sheets-Sheet 6
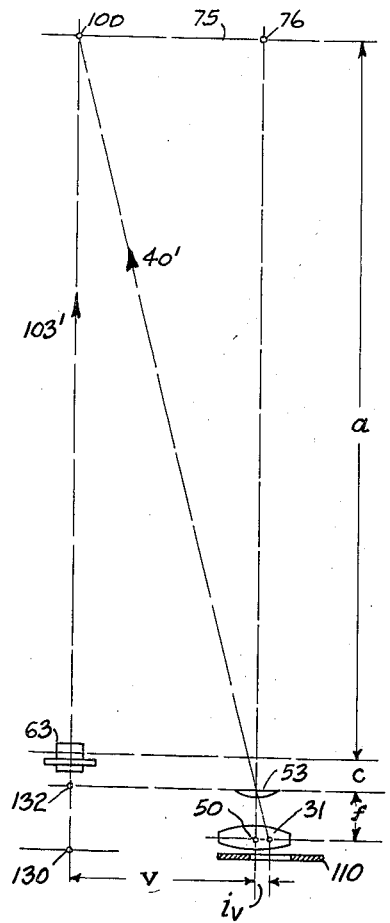
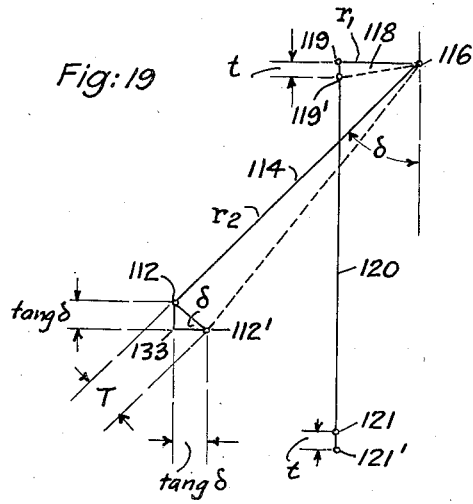
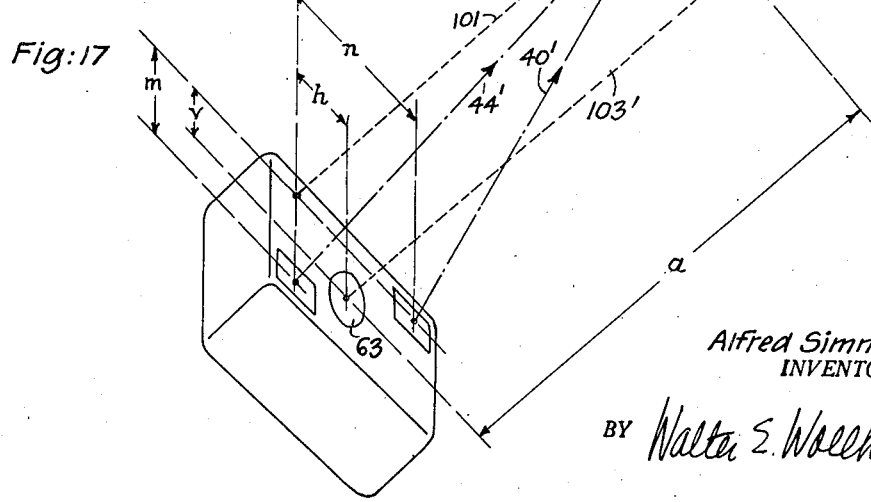
Alfred Simmon
INVENTOR.
BY Walter E. Wollheim
ATTORNEY.

Patented June 28, 1949

2,474,379

UNITED STATES PATENT OFFICE 2,474,379

CAMERA VIEW AND RANGE FINDER

Alfred Simmon, Jackson Heights, N. Y., assignor to Simmon Brothers, Inc., Long Island City, N. Y., a corporation of New York Application June 26, 1946, Serial No. 679,334

5 Claims. (Cl. 95—44)

This invention pertains to a camera view and rangefinder of the so-called "brilliant" type.

A finder of this type consists of a field lens, an image forming lens and a forwardly inclined mirror. The positive field lens is relatively large, usually of square or rectangular shape, arranged in a horizontal plane and adapted to be viewed by both eyes of an observer simultaneously from a convenient reading distance, i. e., of approximately 10". View finders which must be held closely to on eye of the observer and which comprise telescopes of some kind are, therefore, specifically excluded by this definition of a "brilliant" view finder. The positive image forming lens projects an image of the object to be photographed substantially into the plane of the field lens, and the focal length of this image forming lens is preferably such that it covers approximately the same field as a camera lens. Th forwardly inclined mirror is arranged under an angle of approximately 45°, changes the direction of the light beam and acts as an image erecting element so that the observer sees an upright, although still laterally inverted image. The "brilliant" finder thus described is in many respects the most satisfactory camera finder yet devised.

Any view finder can be converted into a rangefinder by splitting its image and by introducing a certain amount of parallaxis between the two part images. For objects closer than infinity the two part images will then be out of register, but by adjusting one or more of the optical elements, coincidence can be restored, and the amount of adjustment necessary for this purpose is a measure of the distance of the object from the camera. Preferably this adjustment is connected with the focusing movement of the camera so that a given object is focused sharply on the film whenever the two parts of its split image in the rangefinder field are in register.

The finder disclosed in the following specifications has the following chief characteristics:

1. The general layout is very simple, only a small number of optical elements being used, namely, three lenses and four reflectors.

2. Lenses and reflectors have been so disposed that both light beams are of equal length.

3. The two respective part images are brought into register by deviating one of the light beams in one, and the other of the light beams in another plane, the second plane being perpendicular to the first plane. This makes it possible to use the above mentioned simple arrangement in which the two light beams have, by necessity, not only a horizontal but also a vertical displacement relative to each other. The two beam deviating means are in a very simple manner connected to each other as well as to the focusing movement of the camera lens.

4. The parting line between the two part images is arranged in close proximity to the field lens. The parting line, therefore, receives substantially no magnification and remains substantially stationary and independent of small movements of the observer's eyes.

5. Means are provided to compensate for the parallaxis between the image shown by the finder and the image shown by the camera lens.

A preferred form of the invention is illustrated in the accompanying drawings in which Fig. 1 shows the general arrangement of the three lenses and four reflectors of a finder embodying my improvements in axonometric projection;

Fig. 2 is a plan view of a camera equipped with a finder of this type, partly in section along the plane of line 2—2 in Fig. 3;

Fig. 3 is a side view of the same, partly in section along the plane of line 3—3 in Fig. 2;

Fig. 4 is a front view of the same;

Fig. 5 shows the means to deviate one of the finder beams in synchronism with the focusing movement of the camera in the infinity position;

Fig. 6 shows the same means in the position for a closeup;

Fig. 7 is a diagram by means of which the dimensions of the parts shown in Figs. 5 and 6 can be computed;

Fig. 8 shows in axonometric projection the means by which the beam deviating devices for both beams are connected to each other;

Fig. 9 is an arrangement of squares representing an object to be photographed;

Fig. 10 shows the appearance of said object in the field of the finder illustrating a certain error with which that image is afflicted;

Fig. 11 is a diagram by means of which the origin of this error is explained;

Figs. 12 and 13 show an alternate configuration of the two part images by means of which this error can be minimized, Fig. 12 showing the two part images "in," and Fig. 13 showing them "out of register";

Fig. 14 shows the image splitting element used for this purpose;

Figs. 15 and 16 show the elements of the parallaxis compensating means in the infinity and in the closeup position, respectively;

Figs. 17, 18 and 19 are diagrams by means of which the specific dimensions of the parallaxis compensating means can be computed.

Like characters of reference denote similar parts throughout the several views and the following specification.

General layout

The general arrangement of the optical parts can be seen in Fig. 1. The operator looks into a positive field lens 31, preferably biconvex, as shown, which is arranged in a substantially horizontal plane and adapted to be viewed by the operator simultaneously with both eyes from a convenient reading distance, i. e., approximately 10″. The line of vision is substantially vertical and indicated by arrow 32. Immediately underneath this field lens is arranged a forwardly inclined reflector 33 which deflects approximately half of the beam represented by arrow 32 in a forward and substantially horizontal direction. It will be noted that the upper edge 34 of this reflector is substantially in contact with the lower surface of the field lens 31 and arranged approximately below its center point.

In front of reflector 33 which hereafter will be designated the "first" reflector is arranged a second reflector 35. This reflector is positioned in a substantially vertical plane comprising an angle of approximately 45° with the now forwardly directed beam, arrow 36, and reflecting it in a lateral, but still substantially horizontal direction, arrow 37. In front of the second reflector there is a first positive image forming lens 38, and in front of this lens a third reflector 39 which is substantially parallel to the second reflector 35. This reflector reflects the beam again in a forward horizontal direction, arrow 40. A third mirror 39 is supported by pivots 41 and can be rotated thereon.

The portion of the beam 32 which is not deflected by the first mirror 33 impinges upon a second positive image forming lens 42. This lens is arranged in a substantially horizontal plane below the field lens 31, but at a considerably lower level than the first reflector 33. Below the first image forming lens there is a fourth reflector 43 which is forwardly inclined under an angle of substantially 45°, i. e., substantially parallel to the first reflector 33. This reflector deflects the vertical line of vision, arrow 32, in a forward direction, arrow 44. The fourth reflector 43 is supported by pivots 45 and can be rotated thereon.

Fig. 1 represents the conditions in the infinity position, when the two beams 44 and 40 are parallel to each other as well as to the optical axis of the camera lens, not shown.

Conditions for equal beam lengths

It is most desirable that the length of the light beams in both optical systems are alike since otherwise it would be impossible to reproduce objects at all distances from the finder equally large. The conditions for equal beam lengths can be seen in Fig. 1. 50 is the center of the field lens 31, 51 the point of intersection of the upper edge 34 of reflector 33 with the line of vision as represented by arrow 32, 52 the point of intersection of the second reflector 35 with the light beam as represented by arrow 36, 53 the center of the first image forming lens 38, 54 the point of intersection of the third mirror 39 with a light beam as represented by arrow 37, 55 the center of the second image forming lens 42, 56 the point of intersection of the fourth reflector 43 with the light beam as represented by arrow 32, 57 the point of intersection of the forwardly directed light beam 44 with a vertical plane passing through point 54 and perpendicular to the two light beams represented by arrows 40 and 44.

The distance between the eyes of the observer and the object to be photographed may be divided into four portions, i. e., from the eyes of the observer to the field lens 31, from said field lens to the two image forming lenses 38 and 42, respectively, from these field lenses to points 54 and 57, respectively, i. e., to points in a vertical plane at right angles to the camera lens, and from points 54 and 57 to the object to be photographed. Of these four portions the first one is, of course, automatically identical for both rangefinder beams. The second parts are identical if the two image forming lenses have the same focal lengths and if the optical distances between these image forming lenses and the field lens are equal to each other, and substantially equal to the focal length of these image forming lenses, i. e., distance 53—52 plus 52—51 plus 51—50 must equal the focal length of lens 42, and the focal lengths of lenses 38 and 42 must be equal to each other.

The third mentioned portions are equal if distance 53—54 of the upper beam equals distance 55—56 plus 56—57 of the lower beam.

Referring to the last portion, the distances from points 54 and 57, respectively, to the object to be photographed are for all practical purposes identical as long as the distance is relatively large or at least 3 ft. For extreme closeups there can, under certain conditions, be a small discrepancy due to the fact that one beam will assume a considerably different angle from the other beam. This condition will be discussed later.

Means to deviate one light beam in coordination with the focusing movement of the camera A camera equipped with a rangefinder built according to this invention is shown in Figs. 2, 3 and 4. In these figures the camera is shown to consist of two principal parts, i. e., a front part 60 and a rear part 61. Both parts are connected by a light tight bellows 62. The front part supports a camera lens 63 together with the shutter and other parts, not shown since they do not form part of this invention, whereas the rear part contains the sensitized film. The distance between both parts can be adjusted for focusing purposes and any of the well known means such as a rack and pinion movement may be used in this connection; no focusing movement has been shown in detail since it forms no part of this invention. It is also possible to design the camera in such a way that the rear part is contained entirely within the front part, as for example, shown in Patent #2,386,575, issued to me on October 9, 1945, but this is merely a modification of the general principle of having two adjustable principal parts, one containing the lens and the other containing the film.

Attached to the front part is the rangefinder built according to this invention and all the elements shown in Fig. 1 can be seen in Figs. 2 and 3.

In Fig. 3 I have shown means by which reflector 43 can be rotated on pivot 45 in coordination with the focusing movement of the camera. Reflector 43 is supported by a reflector support 65 to which a lever 66 is attached. This lever 66 has an inclined surface 67 which, in effect, constitutes a straight cam. The extension of this straight cam passes through a center of rotation of the reflector support 65, i. e., through the center of pivot 45. This lever 66 has an upwardly extended part 68, the purpose of which will be explained later. The lever 66 is biased by a small spring 69.

Fastened to the rear part of the camera 61 is a part 70 which has a knife edge 71 which is in contact with the cam surface 67 of lever 66.

The various parts of this beam deviating device are shown in Fig. 5 in the infinity position and in Fig. 6 as focused for a closeup. Referring to Fig. 5, a dotted line 74 represents the plane of the film which, in the infinity position has a distance F from the optical center of camera lens 63, F being the focal length of this lens. The object plane is at infinity to the right and, therefore, not visible. The straight cam surface 67 of lever 66 comprises the angle $\beta$ with a horizontal line passing through point 56 or 45 which is the same in this instance. The distance between points 56 and 71 shall be called L. The two beams 40 and 44 are vertically displaced by a distance M which is the vertical base distance of the rangefinder. The point of rotation of mirror 43, i. e., point 56, is horizontally displaced by a distance C with respect to the optical center of the camera lens.

Referring to Fig. 6, we can now see that in the close-up position the film plane has shifted to the position 74'. The distance of the plane 74' from the optical center of the camera is b. This distance was in the infinity position, Fig. 5, F and has now increased by $\Delta F$. We have, therefore, $b = F + \Delta F$.

The object plane on which the camera is sharply focused is 75, far to the right. While beam 40 has not changed its direction, beam 44 has done so and is now called 44'. If the rangefinder functions correctly, beams 40' and 44' intersect in the object plane 75 at point 76. The angle between beam 40' and 44' is called $\alpha$.

In order to deflect beam 44 from its horizontal position shown in Fig. 5 to the inclined position 44' shown in Fig. 6, it is obviously necessary to rotate mirror 43 by an angle $\frac{1}{2}\alpha$. This is done by the cooperation of the inclined cam surface 67 and knife edge 71. Knife edge 71 is fastened to the rear part of the camera containing the sensitized film and has, therefore, a fixed relation to the film plane 74. In other words, as film plane 74 travels to its new position 74', knife edge 71 also travels to a new position 71' and the distance between 71 and 71' is again $\Delta F$. This, of course, means that the angle of the inclined cam surface 67 which used to be $\beta$ is now $$\beta - \frac{\alpha}{2}$$

We can get the following relation from triangle 76—51—56 in Fig. 6

$$\tan \alpha = \frac{m}{a+c}$$

Since $\alpha$ is a small angle, the tangent of half the angle equals half the tangent of the whole angle, or $$\tan \frac{\alpha}{2} = \frac{m}{2(a+c)} \quad (1)$$

We can now draw, in Fig. 7, a diagram containing points 71, 71' and 56, and draw from point 71' an additional line which is at right angles to the extension of line 56—71, and which intersects this extension at point 72.

The triangle formed by points 71, 71', 72 has the following dimensions:

Distance 71—71' = $\Delta F$, Figs. 5 and 6
Angle 71'—71—72 = $\beta$, Fig. 5
Distance 71'—72 = $\Delta F \sin \beta$
Distance 71—72 = $\Delta F \cos \beta$ We can now contemplate the triangle 71—72—56 which gives us the following relations:

Distance 71—56 = L, see Fig. 6
Distance 71—72 = $\Delta F \cos \beta$, see above.
Distance 72—56 = $L + \Delta F \cos \beta$
Distance 71'—72 = $\Delta F \sin \beta$, see above.

Angle 71'—56 = $\frac{\alpha}{2}$, Fig. 6.

$$\tan \frac{\alpha}{2} = \frac{\Delta F \sin \beta}{L + \Delta F \cos \beta} \quad (2)$$

From the following two expressions (1) and (2) for $\alpha/2$ we obtain:

$$\frac{m}{2(a+c)} = \frac{\Delta F \sin \beta}{L + \Delta F \cos \beta}$$

From this we can compute $a$:

$$a = \frac{mL}{2 \sin \beta} \cdot \frac{1}{\Delta F} + \frac{m}{2 \tan \beta} - C \quad (3)$$

The same magnitude $a$ may also be computed from the basic formula for the camera lens:

$$\frac{1}{a} + \frac{1}{b} = \frac{1}{F}$$

Substituting $b = F + \Delta F$, this can be transformed to read:

$$a = F^2 \frac{1}{\Delta F} + F \quad (4)$$

The two expressions for $a$, (3) and (4), can be satisfied simultaneously, if $$F^2 = \frac{mL}{2 \sin \beta} \text{ and } F = \frac{m}{2 \tan \beta} - C$$

These equations can be dissolved for $\tan \beta$ and L:

$$\tan \beta = \frac{m}{2(F+C)} \quad (5)$$

$$L = \frac{2F^2}{m} \sin \beta \quad (6)$$

When the rangefinder elements have these dimensions, any object in register in the finder, will be rendered sharply on the sensitized film by the camera lens.

*Means to deviate both light beams simultaneously*

As can be seen from Fig. 1 or Fig. 4, the two light beams emanating from the rangefinder have not only a vertical displacement relative to each other which has been called $m$, but also a horizontal displacement which shall be called $n$. It is, therefore, necessary not only to deflect beam 44 in a vertical plane as shown in Figs. 5 and 6 but also to deflect beam 40 in a horizontal plane. The expedient of deflecting both beams in planes which are at right angles to each other is important since it makes it possible to use the exceedingly simple arrangement of optical parts shown in Fig. 1. The beam 44 is being deflected by tilting mirror or reflector 43 on axis 45, and beam 40 is deflected by tilting reflector 39 on axis 41. In the preceding paragraph a movement has been described by which the tilting of reflector 43 can be accomplished and it will be clear that an identical movement could be used to perform the rotation of reflector 39. The various parts could be dimensioned according to Formulae 5 and 6 by merely substituting $n$ for $m$ and by taking into consideration that the dimension which has been called C is slightly different for the other beam.

There is, however, another possibility, which is a little more convenient and which is based on the fact expressed by Formula 1. This formula shows that the angle $\alpha$ between the two beams in a vertical plane is in direct proportion to the vertical displacement $m$. By the same token the corresponding angle in a horizontal plane would be in direct proportion to the corresponding horizontal displacement $n$. In other words, a movement could be devised by which the rotation of the two reflectors 39 and 43 is mechanically connected in such a way that their respective angles of rotation are in proportion to the horizontal displacement $n$ to the vertical displacement $m$.

This does not take into consideration that the magnitude C is not exactly the same for both systems, but since C is very small compared to $a$, see Formula 1, the error introduced thereby is negligible.

A movement of this type is shown in axonometric projection in Fig. 8. There again, the reflector 43 can be seen mounted on the reflector support 65 and pivoted on shaft 45. Mounted upon the reflector support 65 is lever 66 which has two parts, one comprising the inclined cam surface 67 and the other being a vertical extension 68. Attached to this vertical extension 68 is a triangular block 80 to which a connecting rod 81 is pivotally connected. In a similar way, the reflector 39 is supported by a reflector support 82 and rotated on pivots 41. Attached to the reflector support 82 is a horizontal lever 83, the far end of which is inclined by an angle of approximately 45° and pivotally connected to the other end of the connecting rod 81. The two pivots supporting connecting rod 81 rotate in planes at right angles to each other and, therefore, an additional joint should really be necessary. However, since the angle of rotation is exceedingly small, this can be dispensed with if the connecting rod 81 is merely made from relatively flat stock. The length of the lever 68 between points 45 and the center line of the connecting rod 81 is designated as $o$, and the length of the lever 83 between the point of rotation 41 and the center line of the connecting rod 81 as $p$. From Fig. 8, it will be clear that all one has to do in order to obtain the proper proportion, is to dimension the relative lengths $o$ and $p$ in inverse proportion to the corresponding vertical or horizontal displacements $m$ and $n$.

*Stationary parting line between part images*

As shown in Fig. 1, the upper edge 34 of the first reflector 33 constitutes the parting line between the two part images. Line 34 is as close to the field lens 31 as possible and it may actually be in contact with its lower surface. In this manner the parting line between the two images receives substantially no magnification at all from the field lens and appears, therefore, to both eyes of the observer in the same position and remains, furthermore, stationary and unaffected by small movements of the observer's head. This is important, since nothing is as disconcerting and disturbing to an observer as a parting line which appears to be in two different positions to the two eyes, respectively, and which, furthermore, changes its position whenever the observer moves his head. Numerous attempts to build split field rangefinders of the "brilliant" type have failed because of this unstable condition of the parting line.

A split field image as seen in a finder of this type is, however, afflicted with a certain error which, depending upon conditions, may or may not be objectionable. Close observation of a finder of this type will disclose that not all points of the object to be photographed can be brought into register at the same time if this object is only a relatively short distance away from the camera, in spite of the fact that all points of this object may be in the same vertical plane and have the same distance from the camera. Referring to Fig. 9, I have shown an arrangement of squares which may be considered the object to be photographed. All points on this object are supposed to be in the same plane and disposed at the same distance from the camera lens. If an object of this type is viewed by a finder of the type described from a close distance, it will appear as shown in Fig. 10. Points in the center of the image will be in register, but points on the outer margins will be out of register in the manner shown in Fig. 10, i. e., on the left side the upper squares will appear slightly smaller than the lower squares and on the right side the upper squares will appear slightly larger than the lower squares. The reason for this is shown in Fig. 11 which shows schematically the top view of a finder as focused for a close-up. It can be seen that beam 40' assumes an angle noticeably different from 90° with respect to the object plane 75. This introduces a perspective error since, for example, point 90 is now somewhat closer to the image forming lens 38 than point 91. Due to the fact that the finder shows a laterally inverted image, point 90 appears on the right and point 91 on the left margin of the finder image as shown in Fig. 10. The portion of the finder image in the neighborhood of point 90 being closer to lens 38 will be rendered at a somewhat larger scale than the portion of the object in the neighborhood of point 91 which is farther away than the image forming lens 38. This explains the discrepancy between the proportions of the object shown in Fig. 9 and its appearance in the finder shown in Fig. 10.

Whether this condition is objectionable or not depends upon various considerations. If the nearest object distance for which the camera is designed is relatively large, i. e., 3 ft. or more, or if we deal with a small camera with a short focus lens, preferably of a relatively high F number, such as F:4.5, then the depth of focus of this lens will be large enough to compensate for any error that may be committed by the operator by bringing points 90 or 91 into register rather than points in the center of the picture. If, however, the camera is designed to permit extreme closeups, shorter than 3 ft., or if the camera is relatively large and has a long focus lens, or if the camera has a lens of low F number, for example F:2, then the depth of focus is usually so small that a considerable error is committed by bringing points at the outer margin of the image into register rather than points in the center.

In this instance, it is desirable to minimize this condition by the expedient of making the width of one part image shorter than the full width of the picture. This, however, introduces certain difficulties since the parting line can no longer be a simple straight line in contact with the lower surface of the field lens 31. A simple compromise, however, can be effected by making the outline of the first part image, i. e., the image formed by beam 40, relatively wide in a horizontal direction and relatively narrow in a vertical direction. This can be done in many ways, but the simplest is shown in Fig. 14. A patch of reflecting material 92 is deposited on a clear transparent glass plate 93. This glass plate is substituted for reflector 33 shown in Fig. 1. In this manner, the operator will see substantially the entire image formed by the second image forming lens 42 with the exception of those areas covered by the reflecting patch 92. The rays reflected by this relatively small area then pass the optical system of the first beam in the usual way, i. e., after being reflected by the reflecting patch 92 they are reflected by reflector 35, pass the image forming lens 38 and are again reflected by reflector 39.

Due to the fact that the area occupied by the first part image is long in a horizontal and narrow in a vertical direction, all parts of the corresponding reflecting patch 92 are still very close to the field lens 31 and, therefore, even the parts relatively far away, 94 in Fig. 14, still receive only a very small amount of magnification. The part image, therefore, still remains sufficiently stationary regardless of small variations in the position of the observer's eye and the outline of 92 still appears at least very nearly the same to both eyes of the observer.

A finder of this type presents images as shown in Figs. 12 and 13, respectively. Fig. 12 showing the "in register" and Fig. 13 the "out of register" condition. It can be seen in Fig. 13 that even a very slight "out of register" condition for vertical or near vertical lines will be very noticeable and that accurate focusing with a parting line of this shape can be accomplished with particular speed and convenience. If desired, the patch 92 may be made from semi-reflecting material so that the two images formed by the two optical systems may be seen in superposition.

*Means to compensate for parallaxis*

In Fig. 17 I have shown a schematic picture of a camera including three lines representing the two beams emanating from the rangefinder as well as the beam emanating from the camera lens. In the infinity position all three beams would be parallel to each other, but in a closeup position, as shown, beam 40' will be deflected in a horizontal plane and beam 44' will be deflected in a vertical plane until the two intersect at point 76 which lies in the plane on which the camera lens is sharply focused. The central ray of the beam emanating from the camera lens is called 103' and the point on this ray lying in the plane on which the lens is sharply focused is called 100. It can be seen that beams 40' and 44' always intersect at a point lying on a straight line 101 which is the line of intersection of the horizontal plane within which beam 40' moves and the vertical plane in which beam 44' moves. Point 100 will be imaged by the camera lens in the center of the negative frame at 130. The center 50 of the finder image, however, will be occupied by image of point 76 and the two will not be identical except for infinity. For any closer distance there will be a small but noticeable discrepancy between the two images based upon the non-coincidence of point 76 and 100 or, more generally, of lines 101 and 103'.

It is desirable to provide means to compensate for this parallaxis and I am employing for this purpose a sliding mask arranged above or below the field lens 31, but at any rate, in close proximity to it. The movement of this mask is governed by the focusing mechanism of the rangefinder in such a way that the mask automatically shows the correct cutout of the finder image at all distances. I am aware of the fact that the expedient of using a sliding mask in order to compensate for parallaxis is not new and I am, therefore, not making any broad claims for this device as such, but am merely claiming the specific execution of this idea as described below:

The mechanical arrangement can be seen in Fig. 2 in connection with the camera and again separately in Figs. 15 and 16, Figs. 3 and 15 showing the infinity position and Fig. 16 showing the position for a closeup.

The outline of the field lens 31 is shown in dotted lines and it can be seen that a mask 110 has an extended lug 111 on the upper left side. This lug supports two pivots 112 and 113 which are connected to two parallel levers of equal length 114 and 115. These levers are supported by pivots 116 and 117 which are mounted to the camera housing 60. The two parallel levers 114 and 115 assume in the infinity position an angle δ with a line passing through their respective pivots parallel to the axis of the camera lens. One of these levers, for example, 114 has a projection 118 which carries a pivot 119 which, in turn, is connected to a connecting rod 120. The other end of this connecting rod is connected to a pivot 121 which, in turn, is supported by the upper extension of lever 68, see Fig. 8. Lever 68 is associated with the rotatable reflector support 65 which, in turn, is actuated by the cooperation of the inclined cam surface 67 and knife edge 71 as described in one of the preceding paragraphs.

Instead of having pivot 121 supported by an extension of lever 68, it would, of course, be equally feasible to devise an arrangement by which lever 83, associated with the reflector support 82, performs this duty and it is merely a matter of convenience which of the two levers should be selected.

By looking at Figs. 2 and 3 it can be seen that the two pivots 121 and 119 of connecting rod 120 perform rotary motions in two planes at right angles to each other. An additional joint would, therefore, be theoretically necessary except for the fact that the angular movement of all parts is quite small. Particularly if one makes connecting rod 120 from flat stock, this additional joint can, therefore, be dispensed with.

During the operation, point 121 travels in a straight line parallel to the axis of the camera lens and assumes for a closeup the position 121' shown in Fig. 16. This, in turn, shifts point 119 to its new position 119' thereby rotating levers 114 and 115 slightly. The mask 110 consequently travels a small distance in a substantially diagonal direction and assumes the new position shown in Fig. 16. In other words, for the infinity position, narrow strips on the right and lower margins of the finder image as received by the field lens are being omitted whereas in the closeup position narrow strips in the left and higher margin are being omitted. Compare Figs. 15 and 16. For intermediate distances, of course, the mask will assume some suitable intermediate position.

The specific dimensions of a mechanism of this type can be computed by means of the diagrams shown in Figs. 17, 18 and 19.

In Fig. 17 I have called the vertical displacement of beam 40 with respect to lens axis 103$v$ and the horizontal displacement of beam 44 with respect to the axis of the camera lens 103$h$. These displacements are, of course, measured in the infinity position in which all three beams are parallel.

In Fig. 18 I have shown a vertical view of beam 40′ and 103′. The reflectors which in reality are present in the finder system have been omitted and merely the image forming lens and the field lens have been shown. A point 100 on the center line of the axis of the camera lens at a distance $a$ will be reproduced on the film at point 130. The same point will be reproduced by the image forming lens of the finder not in the center of the finder image, but offset by distance $i_v$. This is the distance by which the sliding mask must be moved in order to compensate for the discrepancy of the two images caused by the displacement $v$. The focal length of the image forming lens is called $f$ and the distance by which the image forming lens would be displaced behind a vertical plane through the optical center of the camera lens after omission of the reflectors is called $c$.

A substantially identical diagram can be drawn showing the relation of beam 44′ and 103′. This has not been actually shown in the drawings attached to this application since it is merely necessary to replace the dimension $v$ by $h$ and the dimension $i_v$ by $i_h$.

In Fig. 10 I have shown diagrammatically the levers 114 and 118 and the connecting rod 120. The position for infinity is shown in solid lines and the position for a closeup is shown in dotted lines. The distance between point 116 and point 119, i. e., the length of lever 118 is called $r_1$, and the distance between point 116 and point 112, i. e., the length of lever 114, is called $r_2$. The distance between points 121 and 121′ is called $t$. This distance is identical to the distance between points 119 and 119′. The distance between points 112 and 112′ is called T.

As it can be seen, that in Fig. 18, triangle 100—63—132 is similar to triangle 53—59—13. This gives the relation:

$$\frac{i_v}{f}=\frac{v}{a+c}$$

The similar diagram for beams 44′ and 103′ which is not shown, would give:

$$\frac{i_h}{f}=\frac{h}{a+c}$$

From these two equations is obtained:

$$\frac{i_v}{i_h}=\frac{v}{h} \text{ and } i_v=\frac{f.v}{a+c}$$

Returning for a moment to Fig. 6 from which we get the two expressions:

$$\tan\frac{\alpha}{2}=\frac{\alpha}{2}=\frac{1}{2}\left(\frac{m}{a+c}\right)$$

and $$t=R\cdot\frac{\alpha}{2}$$

These can be combined to read:

$$t=\frac{1}{2}R\left(\frac{m}{a+c}\right)$$

In Fig. 19 one has triangle 116—119—119′ similar to triangle 116—112—112′, and therefore:

$$\frac{T}{t}=\frac{r_2}{r_1}$$

or $$T=t\cdot\frac{r_2}{r_1}=\frac{1}{2}R\cdot\frac{r_2}{r_1}\left(\frac{m}{a+c}\right)$$

In the same triangle 112—112′—133, one has:

Distance 112—133 = $i_v$
Distance 112′—133 = $i_h$
Distance 112—112′ = T
Angle 112—112′—133 = $\delta$ $$i_v = T \sin \delta$$
$$i_h = T \cos \delta$$
$$\tan \delta = \frac{i_v}{i_h}$$

For $$\frac{i_v}{i_h}$$

can be substituted $$\frac{v}{h}$$

see above, Fig. 18, and obtained:

$$\tan \delta = \frac{v}{h}$$

$$\sin \delta = \frac{\tan \delta}{\sqrt{1+\tan \delta^2}} = \frac{v^2}{\sqrt{v^2+h^2}}$$

There are now two expressions for $i_v$, first $$i_v = \frac{f.v}{a+c}$$

and second, $$i_v = T \sin \delta$$

Replacing in the last equation T by $$\tfrac{1}{2} R\left(\frac{m}{a+c}\right)$$

and $\sin \delta$ by $$\frac{v}{\sqrt{v^2+h^2}}$$

one obtains:

$$i_v = \tfrac{1}{2} R\left(\frac{m}{a+c}\right)\cdot\frac{v}{\sqrt{v^2+h^2}}$$

The two equations for $i_v$, therefore give finally the relation:

$$\frac{2f}{m}\cdot\sqrt{v^2+h^2}=R\frac{r_2}{r_1}$$

While I have shown and described a preferred embodiment of the invention, it is obvious that many changes of form, proportions and minor details of construction may be resorted to without departing from the principles or sacrificing any of the advantages of the invention as defined in the appended claims.

What I claim as new is:

1. In a camera comprising two main parts and means to adjust their relative distance, one part supporting a camera lens and the other part supporting a sensitized film, a rangefinder of the brilliant type comprising a structure supporting one field lens, a first and a second optical system, cooperating to show two supplementary part images of the object to be photographed, and means to shift, in coordination with said first named adjusting means, said part images into mutual register, said field lens being a positive lens, arranged in a substantially horizontal plane and adapted to be viewed by both eyes of the observer from a convenient reading distance, the line of vision being substantially vertical and at right angles to the axis of the camera lens, said first optical system comprising a first reflector, a second reflector, a first image forming lens and a third reflector, said second optical system comprising a second image forming lens and a fourth reflector, said first reflector mounted closely underneath said field lens but covering less than the full area of said field lens and being forwardly inclined, forming an angle of substantially 45° with the substantially vertical line of vision and reflecting it in a forward direction substantially horizontal and parallel to the axis of the camera lens, said second reflector arranged in front of said first reflector in a substantially vertical plane, forming an angle of substantially 45° with the axis of the camera lens and with the now forwardly directed line of vision, reflecting it into a lateral direction substantially horizontal and at right angles to the axis of the camera lens, said first image forming lens being a positive lens, laterally offset in a horizontal direction with respect to said second reflector and arranged in a substantially vertical plane substantially parallel to the axis of the camera lens, said third reflector laterally offset with respect to said second reflector in the same horizontal direction as, but farther away than said first image forming lens, arranged in a plane substantially parallel to said second reflector and reflecting the now laterally horizontal line of vision again forwardly in a substantially horizontal direction, substantially parallel to the axis of the camera lens, said second image forming lens being a positive lens, arranged underneath said field lens in a substantially horizontal plane, but at a lower level than said above mentioned first reflector, said fourth reflector mounted underneath said second image forming lens and being forwardly inclined, forming an angle of substantially 45° with the substantially vertical line of vision and reflecting it in a forward direction substantially horizontal and parallel to the axis of the camera lens, said means to shift the two part images into mutual register comprising means to rotate said third reflector on a substantially vertical axis, thereby deviating the light beam accepted by the first optical system in a substantially horizontal plane, and simultaneously to rotate said fourth reflector on a substantially horizontal axis, thereby deviating the light beam accepted by said second optical system in a substantially vertical plane, the means to rotate said reflectors comprising pivoted supports for either reflector, and said means to coordinate the shifting of the two part images with the first named means to adjust the relative distance of the first main camera part supporting the camera lens and the second main camera part supporting the sensitized film comprising a lever attached to one of said rotatable reflector supports, said lever equipped with a straight cam surface, the extension of which passes through the axis of rotation of said support, and a member with a knife edge in operative contact with said straight cam surface, the above named structure supporting the rangefinder connected to one of said main camera parts and said member with the knife edge connected to the other main camera part.

2. A rangefinder according to claim 1, either support equipped with a lever extending substantially at right angles to the respective axis of rotation of said support, and a link pivotally connecting the ends of both levers.

3. A rangefinder according to claim 1, the position and dimension of said straight cam being determined by the two formulae:

$$\tang \beta = \frac{M}{2(F+C)}$$

and $$L = \frac{2F^2}{M} \sin \beta$$

Where $F$=the focal length of the camera lens,
$\beta$=the angle between the straight cam and the optical axis of the camera lens, measured in the infinity position,
$M$=the displacement between the two light beams accepted by the finder, measured in a plane at right angles to the axis of rotation of the reflector support to which said straight cam is attached,
$C$=the distance between the optical center of the camera lens and the axis of rotation of said reflector, measured in the direction of the optical axis of the camera lens,
$L$=the length of said straight cam, between the axis of rotation of the reflector support to which said cam is attached, and said knife edge, measured in the infinity position.

4. In a camera comprising two main parts supporting, respectively, a camera lens and a sensitized film and focusing means adapted to adjust the distance between said main parts, a range finder of the brilliant type comprising a structure supporting a single field lens and a first and second optical system adapted to form two supplementary part images of the object to be photographed substantially in the plane of said field lens, and a mechanism, operatively connected to said focusing means, adapted to shift said part images into register when a sharp image of the object to be photographed is projected by said camera lens on said sensitized film, said field lens being a positive lens, arranged in a substantially horizontal plane and adapted to be viewed by both eyes of the observer from a convenient reading distance, the line of vision being substantially vertical and at right angles to the axis of the camera lens, said first optical system comprising a first reflector, a second reflector, a first image forming lens and a third reflector, said second optical system comprising a second image forming lens and a fourth reflector, said first reflector mounted closely underneath said field lens but covering less than the full area of said field lens and being forwardly inclined, forming an angle of substantially 45° with the substantially vertical line of vision and reflecting it in a forward direction substantially horizontal and parallel to the axis of the camera lens, said second reflector arranged in front of said first reflector in a substantially vertical plane, forming an angle of substantially 45° with the axis of the camera lens and with the now forwardly directed line of vision, reflecting it into a lateral direction substantially horizontal and at right angles to the axis of the camera lens, said first image forming lens being a positive lens, laterally offset in a horizontal direction with respect to said second reflector and arranged in a substantially vertical plane substantially parallel to the axis of the camera lens, said third reflector laterally offset with respect to said second reflector in the same horizontal direction as, but farther away than said first image forming lens, arranged in a plane substantially parallel to said second reflector and reflecting the now laterally horizontal line of vision again forwardly in a substantially horizontal direction, substantially parallel to the axis of the camera lens, said second image forming lens being a positive lens, arranged underneath said field lens in a substantially horizontal plane, but at a lower level than said above mentioned first reflector, said fourth reflector mounted underneath said second image forming lens and being forwardly inclined, forming an angle of substantially 45° with the substantially vertical line of vision and reflecting it in a forward direction substantially horizontal and parallel to the axis of the camera lens, said mechanism to shift said part images into register comprising cam and lever means adapted to rotate said third reflector on a substantially vertical axis, and simultaneously to rotate said fourth reflector on a substantially horizontal axis, said rotating means comprising pivoted supports for said reflectors, a substantially horizontal lever connected to the support of said third reflector, a substantially vertical lever connected to the support of said fourth reflector, and a first link pivotally connecting both levers, one of said levers extending beyond the pivot point to which said first link is attached, and means to compensate for the parallaxis between finder and camera lens, said means comprising a mask with a substantially rectangular cut out arranged in a horizontal plane in close proximity to said field lens and adapted to slide in a substantially diagonal direction, moving forwardly and towards said first image forming lens for long distances and rearwardly and away from said image forming lens for closeups, a pair of pivoted, parallel levers, disposed in a horizontal plane and supporting said mask, these levers arranged in a direction substantially at right angles to the direction in which said mask moves, one of said levers having a projection in a horizontal plane and substantially at right angles to the axis of the camera lens, said projection carrying a pivot connected to a second link, the other end of said second link connected to another pivot carried by said above mentioned extension of said extended lever to which said first link is attached.

5. A rangefinder according to claim 4, the elements of said parallax compensating mechanism complying with the two formulae:

$$\tang \delta = \frac{v}{h}$$

and $$\frac{r_2}{r_1} R = 2 \frac{f}{m} \sqrt{v^2 + h^2}$$

Where $\delta$ = the angle between the lens axis and one of said parallel mask supporting levers, in the infinity position, $v$ = the vertical displacement of the upper rangefinder beam with respect to the camera lens, $h$ = the horizontal displacement of the lower rangefinder beam with respect to the camera lens, $m$ = the vertical displacement between the two rangefinder beams, all displacements measured in the infinity position, when all three beams are parallel, $f$ = the focal length of the image forming lens, $R$ = the length of said extended lever, between point of rotation and pivot supporting said second link, $r_2$ = length of the two parallel mask supporting levers, $r_1$ = length of the horizontal projection attached to one of said levers, between point of rotation and pivot supporting second link.

ALFRED SIMMON.

REFERENCES CITED

The following references are of record in the file of this patent:

UNITED STATES PATENTS

| Number | Name | Date |
| --- | --- | --- |
| 2,208,222 | Mische | July 16, 1940 |
| 2,303,767 | Simmon | Dec. 1, 1942 |
| 2,418,108 | Simmon | Mar. 25, 1947 |